United States Patent
Mala

(10) Patent No.: US 12,394,265 B2
(45) Date of Patent: Aug. 19, 2025

(54) SINGLE USE DONGLE VEHICLE KEY PROGRAMMING SYSTEM AND METHOD

(71) Applicant: SmartBox Technology, LLC, Denver, CO (US)

(72) Inventor: Ornis Mala, Buffalo grove, IL (US)

(73) Assignee: KORE, CO LLC, Frisco, TX (US)

( * ) Notice: Subject to any disclaimer, the term of this patent is extended or adjusted under 35 U.S.C. 154(b) by 23 days.

(21) Appl. No.: 18/138,260

(22) Filed: Apr. 24, 2023

(65) Prior Publication Data
US 2024/0355160 A1    Oct. 24, 2024

(51) Int. Cl.
*G07C 9/00* (2020.01)
*B60R 25/24* (2013.01)
*G07C 9/20* (2020.01)

(52) U.S. Cl.
CPC .......... *G07C 9/00857* (2013.01); *B60R 25/24* (2013.01); *G07C 9/00309* (2013.01); *G07C 9/215* (2020.01); *B60R 2325/20* (2013.01)

(58) Field of Classification Search
None
See application file for complete search history.

(56) References Cited

U.S. PATENT DOCUMENTS

| | | | |
|---|---|---|---|
| 8,841,987 B1 * | 9/2014 | Stanfield | B60R 25/241 340/5.61 |
| 9,684,500 B2 | 6/2017 | Margol et al. | |
| 9,836,904 B2 | 12/2017 | Ramchandani et al. | |
| 9,842,287 B2 * | 12/2017 | Armitage | G06K 19/06037 |
| 9,947,153 B2 * | 4/2018 | Bergerhoff | H04L 9/0869 |
| 10,528,334 B2 | 1/2020 | Margol et al. | |
| 11,062,534 B2 | 7/2021 | Jingle et al. | |
| 11,195,356 B2 | 12/2021 | Mala | |
| 11,232,661 B2 | 1/2022 | Tonsing et al. | |
| 11,282,312 B2 | 3/2022 | Determann et al. | |
| 2004/0003230 A1 * | 1/2004 | Puhl | H04L 9/3247 713/155 |
| 2005/0179320 A1 * | 8/2005 | Shimomura | B60R 25/2018 340/5.85 |
| 2006/0047567 A1 * | 3/2006 | Mandy | G07F 17/246 705/13 |
| 2006/0082434 A1 * | 4/2006 | Brey | B60R 25/2018 340/5.33 |
| 2007/0296559 A1 * | 12/2007 | Fehr | B60R 11/0264 340/426.2 |
| 2008/0278282 A1 * | 11/2008 | Waldmann | G07C 5/008 340/5.8 |
| 2013/0186798 A1 * | 7/2013 | Naor | B65D 83/08 383/105 |
| 2013/0317693 A1 * | 11/2013 | Jefferies | G06Q 30/0645 701/31.5 |
| 2014/0104771 A1 * | 4/2014 | Colan | G08C 17/02 361/679.4 |
| 2018/0095456 A1 * | 4/2018 | Obaidi | G07C 9/00174 |
| 2018/0211463 A1 * | 7/2018 | Mala | G07C 9/00571 |
| 2019/0266823 A1 * | 8/2019 | Mala | G06F 16/2455 |
| 2019/0392664 A1 * | 12/2019 | Determann | G07C 9/00658 |

(Continued)

*Primary Examiner* — Carlos Garcia

(57) ABSTRACT

A system and method for a single use device for customer vehicle key programming. The device takes the form of a so-called dongle that plugs into the vehicle OBD. The customer uses an application on a smartphone to communicate with the vehicle through the dongle on one end and with the system servers on the other.

12 Claims, 3 Drawing Sheets

(56) References Cited

U.S. PATENT DOCUMENTS

| | | |
|---|---|---|
| 2021/0319634 A1 | 10/2021 | Jingle et al. |
| 2022/0139137 A1* | 5/2022 | Johnson ............. G07C 9/00857 340/5.25 |
| 2022/0297634 A1* | 9/2022 | Kim ........................ B60R 25/24 |
| 2022/0383666 A1 | 12/2022 | Edgar |
| 2022/0385747 A1 | 12/2022 | Edgar |

* cited by examiner

SINGLE USE DONGLE VEHICLE KEY PROGRAMMING SYSTEM AND METHOD

CROSS-REFERENCE TO RELATED APPLICATION

None.

BACKGROUND OF THE INVENTION

I. Field of the Invention

The present disclosure relates generally to the programming of keys, and more specifically to a system and method for single use dongle vehicle key pairing and programming.

II. Description of the Prior Art

Keys have an uncanny ability to get lost inside coat pockets or underneath couch cushions or to somehow disappear altogether. Prior to the 1990s, while certainly inconvenient, key replacement was not overly complicated nor costly. A basic car key had no security feature other than its unique cut. The shank, which is the long metal part of the key, had cuts and grooves like a house key, for example. Spare keys could be obtained at almost any hardware store or locksmith shop, and of course the car dealership. It is relatively easy to copy these keys. Indeed, a locksmith doesn't need any extra equipment as he can use the same machine he uses to cut other keys. Unfortunately, because such keys are easy to copy, it is/was also relatively easy for a thief to steal the vehicle. While advancements in key technology have made vehicles more difficult to steal, the costs of key replacement has dramatically increased with each advancement.

The first advancement, and the one on most cars, was the electronic key fob, also known as a remote or transmitter. When such a key needs replacement, it will need to be programmed for the specific car. Such programming, for example, may possibly be done with a specific combination of button presses on the remote and key turns on the car ignition. Some owner manuals provide this information, and it might also be available online, but dealerships often want to charge a key programming fee on top of the key replacement fee.

The next advancement was the electronically programmed transponder key. To start a vehicle with an electronic transponder key system, a key having the proper code must be inserted into the ignition. If the electronic transponder key does not provide the appropriate signal, based upon the electronic code programmed into the key, the vehicle's security system will not authorize starting, and the ignition will not work. This so-called ignition immobilizer prevents the vehicle from being stolen in most cases. Immobilizers are so effective at preventing theft that they are now offered standard on most new cars; and they can be installed as an aftermarket option on older vehicles. One disadvantage of these immobilizer systems is that vehicle keys with the embedded transponder are more expensive and time consuming to replace if lost and usually requires a visit to a dealership. However, programming of transponder keys can be done with a so-called multiple vehicle programmer, which is typically a very expensive handheld electronic device capable of interfacing with the vehicle security system, reading electronic values from the vehicle computer system, and programming an electronic key based upon values read out from the vehicle computer. In order to properly interface with the vehicle and program keys, the device must have the appropriate vehicle immobilizer algorithm. Without this algorithm the device will not work. As such, these multiple vehicle programmers must have the correct algorithms for each make model and year of vehicle.

Further technological key enhancement has provided the so-called smartkey, which are not even keys in the traditional sense. They are fobs that are either inserted in the dash or, in the more advanced systems, stay in your pocket or purse. The vehicle is started with a mere press of a button. The main additional form of security of the smartkey is its ability to use rolling security codes. The system randomizes the correct code and prevents thieves from hacking using a device called a code grabber. The vehicle computer recognizes the code emitted by the smartkey and verifies it within the immobilizer before starting the engine. Replacement of smartkeys are very costly. Indeed, dealerships tend to keep programming in-house to keep and protect the inflated cost of replacement.

As keys are lost, destroyed, stolen, or may become inoperable, dealerships and specialized locksmiths provide a service of programming a new key to work with a given vehicle. The cost of the key replacement, and especially the service to program the replacement key, becomes increasingly high from fob to transponder to smartkey. Indeed, modern keys are not something the lay person could replace easily. In particular, to pair such keys typically requires a cutting/milling tool to match the blade, if so equipped, and specialized programming tools, unavailable to the public, to pair with the vehicle.

In the pairing process these tools usually connect to the on-board diagnostic ("OBD") port on the vehicle and communicate with various systems within the vehicle. The process of pairing keys to a vehicle may be a complicated, costly and time-consuming process. Often, only car dealerships have the capability and the costly programming equipment required to pair a key. Therefore, the dealership will charge a premium for their service. As an alternative to having to go to the dealership, remote OBD devices have been developed to more conveniently pair a key to a vehicle.

The preeminent such remote OBD device is disclosed in U.S. Pat. No. 10,339,739 titled VEHICLE KEY PROGRAMMING SYSTEM AND METHOD, and incorporated herein by reference. The device thereof uses immobilizer algorithms to program keys and more specifically such algorithms are optimized with each attempted use. While this device provides exceptional programming capabilities at a far better cost than going to the dealership it nevertheless remains relatively expensive. Additionally, a lay person still cannot program their own keys.

Recent tools now include vehicle specific dongles which when connected directly to a vehicle OBD initiate a process of registering a maximum number of keys. This is a low-cost alternative and solution to procedures that previously required the use of a scan tool. It enables keys to be paired to a vehicle by a consumer rather than through a dealer or locksmith. However, such tools are both limited in their range as well as their programming accuracy. Therefore, there exists a need for a new and improved device for vehicle key programming. The present disclosure seeks to overcome these and other disadvantages and limitations in the conventional systems and methods.

Accordingly, it is a general object of the present disclosure to provide a more cost and time effective system and method for vehicle key programming.

It is another general object of this disclosure to provide an all-inclusive system and method that can program all vehicle keys, including smartkeys, remote head keys, fobiks, remotes and transponder keys.

It is a more specific object of the present disclosure to provide a system and method utilizing a dongle and an application for vehicle key programming.

It is another more specific object of the present disclosure to provide a system and method for a customer to program a vehicle key through a dongle.

It is yet another more specific object of the present disclosure to provide a dongle vehicle key programming system and method that uses immobilizer algorithm options to optimize appropriate algorithms.

These and other objects, features and advantages of this disclosure will be clearly understood through a consideration of the following detailed description.

SUMMARY OF THE INVENTION

According to an embodiment of the present disclosure, there is provided a system for programming vehicle keys that includes a server having vehicle information including vehicle immobilizer algorithms, a personal communication device having a vehicle key programming application, and a programming device having a vehicle interface for communicatively coupling with a vehicle and a vehicle key, wherein the device is communicatively coupled with the server for requesting and receiving vehicle specific information and is communicatively coupled with the programming device for utilizing the information to program a key.

There is also provided a method for programming vehicle keys providing the steps of obtaining an appropriate key and associated programming device, downloading an application to a personal communication device; inserting the programming device into a vehicle on board diagnostic port, imputing vehicle information and receiving a vehicle specific immobilizer algorithm, and programming the key.

There is also provided a device for programming vehicle keys including a housing encasing a device processor, a vehicle interface for communicatively coupling with a vehicle and a key, a personal communication device interface for communicatively coupling with a communication device having a vehicle key programming application wherein the device utilizes vehicle specific information and the application to program a key.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which.

DESCRIPTION OF THE PREFERRED EMBODIMENTS

Figure 1:
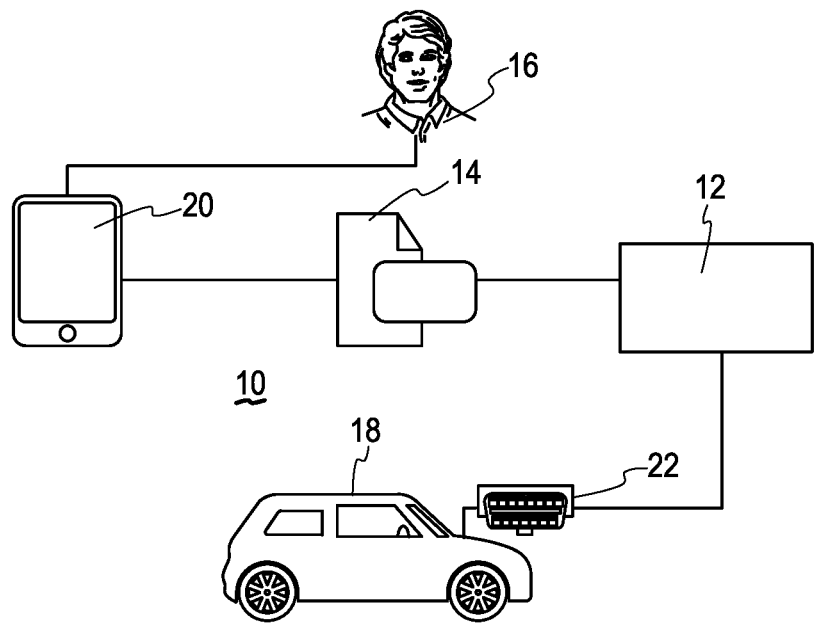
FIG. 1 is a practical user overview diagram of the vehicle key programming system and method of the present disclosure.

One or more embodiments of the subject disclosure will now be described with the aid of numerous drawings. Turning first to FIG. 1, a practical user overview of an embodiment of the present vehicle key programming system and method is shown. In particular, the system 10 includes a programming device (dongle) 12 and system application (software) 14 in which a user 16 can communicate with a vehicle 18 through a personal communication device (PCD) (e.g. smartphone) 20 and the vehicle on-board diagnostics (OBD) port 22.

Figure 2:
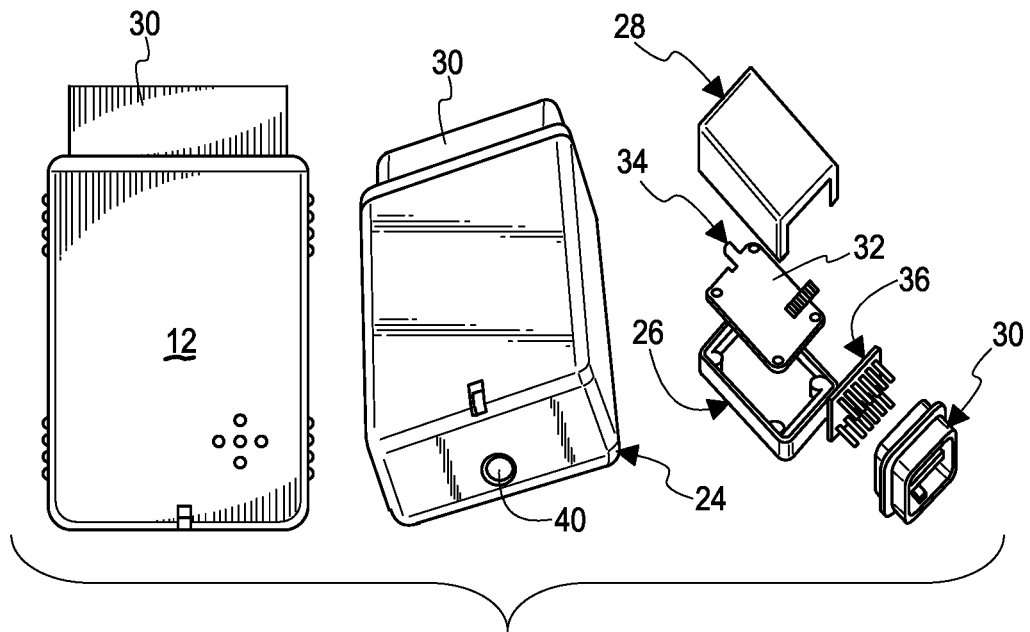
FIG. 2 is an exploded view of an exemplar dongle enclosure of the key programming system and method of the present disclosure.

FIG. 2 illustrates an exemplar unique dongle 12 with a housing 24 that includes a top casing 26, a bottom casing 28 and a connector casing 30. The dongle 12 also includes a processor and a circuit board 32, an LED 34 and a connector 36 that sits within the housing 24. The housing preferably also includes speaker apertures 38 and an LED aperture 40.

Figure 3:
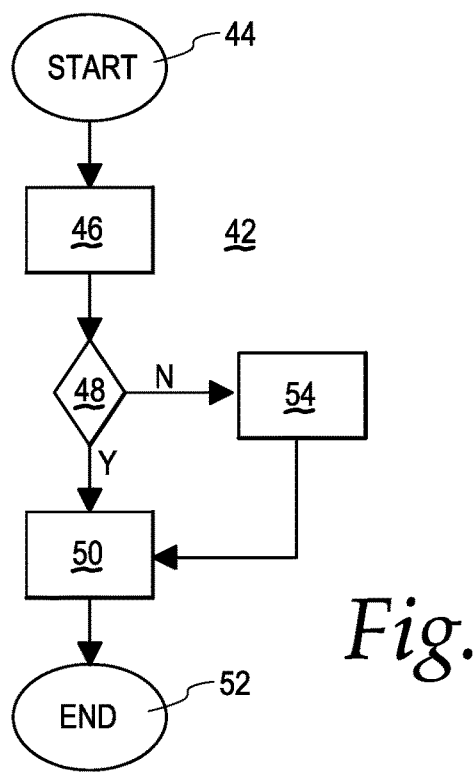
FIG. 3 is a simplified logic diagram of a process of obtaining the correct dongle.

The system and method is initiated upon a user becoming aware of a missing or inoperable key. See FIG. 3, depicting the logic 42 of obtaining the correct dongle. Once aware of the need for a new key 44, the user ordered same 46. If 48 the key was ordered through the subject system, then the key and associated dongle are sent 50 to the user and this logic ends 52. If not, then the procurement third party 54 provides the key and the user or the third party notifies the system of same so that the appropriate vehicle specific dongle can be provided to the user 50 before the logic ends 52.

Figure 4:
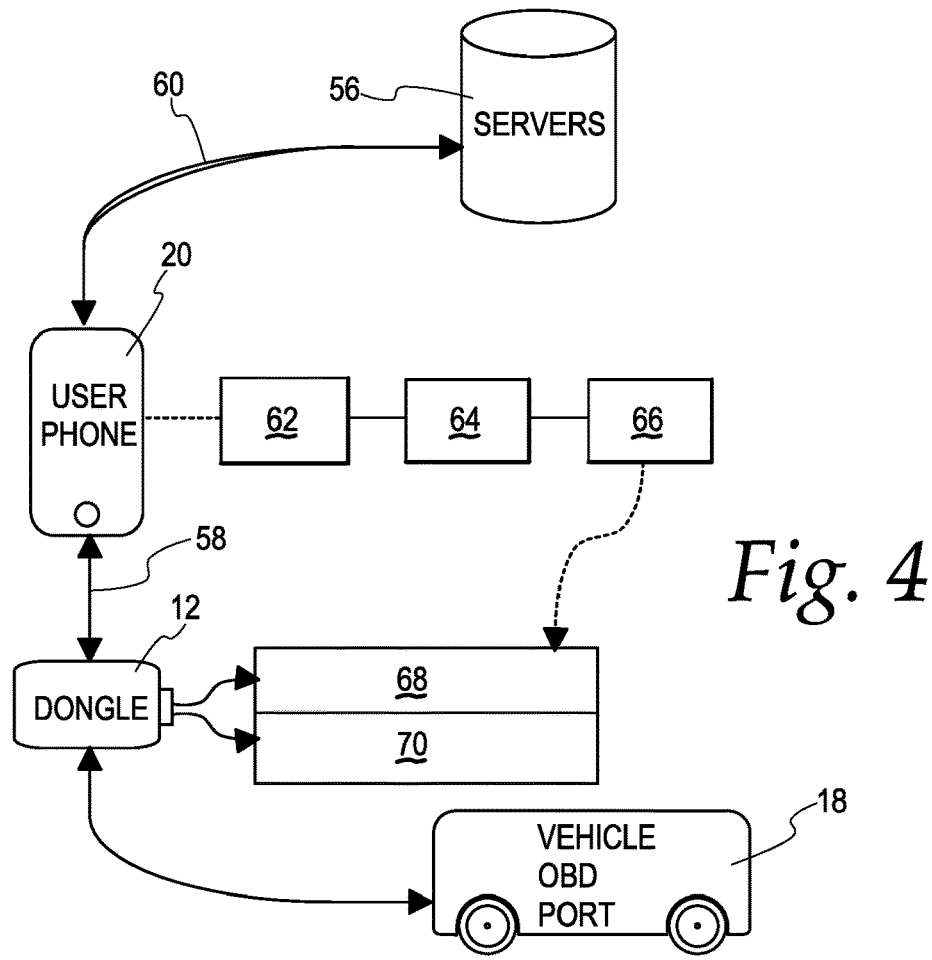
FIG. 4 is a workflow diagram of the dongle logic flow of the key programming system and method of the present disclosure.

Turning now to FIG. 4, in order for the user to now program the new key they need to first download the application 14 on their smartphone 20. The app 14 will then connect to the programming device or dongle 12 and through the dongle 12 to the vehicle 18. The app 14 will then also connect to the system servers 56. The server has all vehicle algorithms (e.g., immobilizers), sequences, calculations, security information and the like—essentially whatever is needed to successfully program a key to a vehicle. The currently preferred app communication protocols include Bluetooth 58 between the smartphone 20 and the dongle 12, and internet (cellular or Wifi) 60 between the smartphone 20 and the servers 56. It will be appreciated that the system and method can use other protocols and is not limited therein.

The user, via app 14, selects 62 the make/model/year or simply enters or scans the VIN. The request is sent to the server 56 to retrieve the algorithm that pertains to the selected vehicle. The specific algorithm and all other necessary firmware files, etc. are downloaded 64. The dongle 12 then changes its state into a programming mode 66.

It will be appreciated that while the system preferably utilizes slightly different and separate technology that makes it possible to program different types of vehicles, and as such has different types of dongles (e.g., Dongle A, Dongle B, Dongle C, etc.) 68, it is not limited thereto. Indeed, while there may be a plethora of different vehicle specific dongles available, under this system and method, there may also be a universal dongle 70 that can be used for most or perhaps all vehicles. In any event, the vehicle specific dongle is downloaded with the current data/information for key programming.

Figures 5, 6:
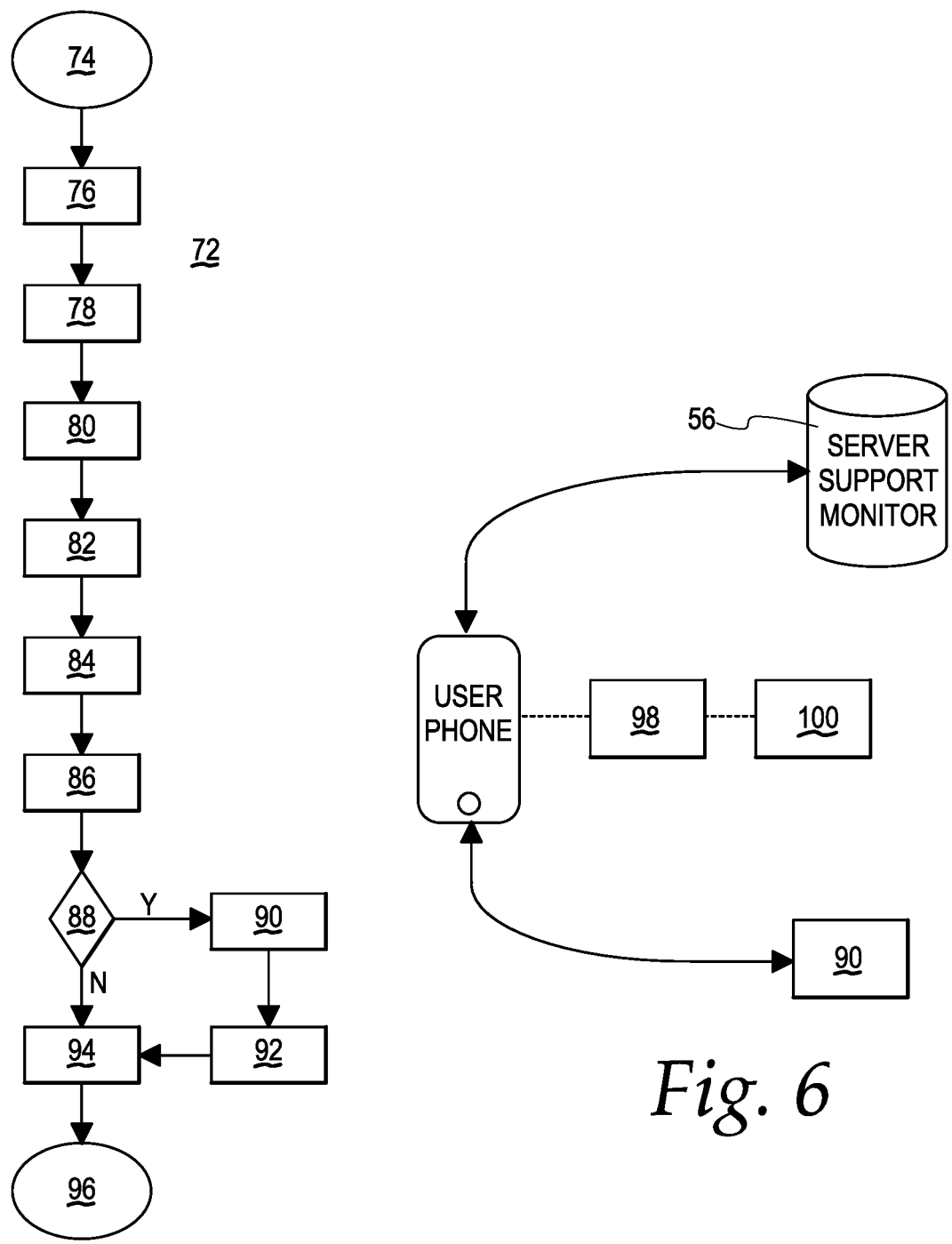
FIG. 5 is a simplified logic diagram of the key programming of the vehicle key programming system and method of the present disclosure.
FIG. 6 is a workflow diagram of a support feature of the key programming system and method of the present disclosure.

FIG. 5 illustrates a simplified logic flow 72 of the key programming of the system and method of the present invention. The general flow starts 74 and user obtains the key and dongle 76. The user then downloads 78 the system app 14 onto their smartphone 20. They insert 80 the dongle 12 into the vehicle 18 OBD port 22 and provides 82 the VIN or enters the make/model/year of the vehicle. The system responds to this request and the correct immobilizer algorithm (IMMO) is downloaded 84 to the smartphone 20. The user then proceeds through the specific steps 86 of the IMMO to program the key. If there are any issues 88 with the programming phase the user is prompted to contact customer service 90 which will remote in 92 through the application and program 94 the key. If there are no issues 88 the user programs 94 the key and the flow stops 96. Throughout the programming process, the system server(s) not only provide the correct IMMO but are also available for calculation purposes as may be needed.

The system includes a remote support, which is shown with a simplified workflow diagram of FIG. 6. Essentially, the app 14 on the smartphone 20 has the ability to allow the server(s) 56 to have a socket connection to the vehicle 18 through the dongle 12 via OBD port 22. As such the functions are directly controlled from the server within milliseconds. By way of example, when a user needs support, he simply calls the support line 90 to retrieve an access code 98. Once the access code is entered by the user, support personnel has the ability to connect to the app 14 and is ready to control app functions. This is done internally, through app source code. Communication is transmitted to the servers 56 and a two-way communication is created to allow the support team to not only see and monitor the programming steps, but also take action in any particular step of the sequence. Each of these connections has an encrypted and designated identifier 100 which allows for unlimited connections to be established as well as refrain from accessing personal user devices 20 at a deeper level. Indeed, high security is guaranteed on all ends.

The system and method is for a single use. In other words, one dongle for one programmed key. If a user purchases two keys, then the system will allow two uses. When the user purchases the keys, the dongle to be shipped is designated for either one or two uses. This is assigned and locked within the system by dongle 12 serial number. The system has numerous safeguards in place to prevent unauthorized programming. By way of example, if there are more download attempts from a particular IP address than are authorized, then the system will locate the IP and lock the phone.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A system for programming a blank vehicle key, the system comprising:
   a system server having vehicle information including vehicle immobilizer algorithms;
   a personal communication device having a vehicle programming application;
   a programming device having a vehicle interface for communicatively coupling with a vehicle and the vehicle key; and
   said personal communication device remains communicatively coupled to both said server for requesting and receiving vehicle specific information and to said programming device for utilizing said information during programming of said vehicle key with one of said immobilizer algorithms to enable said key to work with said vehicle.

2. The system as defined by claim 1 further including a remote customer service capable of programming said vehicle key to said vehicle.

3. The system as defined by claim 1 wherein said personal communication device is a smartphone.

4. The system as defined by claim 1 wherein said programming device is single use.

5. The system as defined by claim 1 wherein said programming device includes an OBD connector for coupling with said vehicle.

6. A method for programming a blank vehicle key, the method consisting of:
   obtaining the vehicle key and associated programming device;
   downloading a programming application to a personal communication device;
   coupling said programming device to a vehicle;
   communicatively coupling said personal communication device to a server and said programming device; and
   programming said vehicle key with an immobilizer algorithm to enable said key to work with said vehicle while said personal communication device remains communicatively coupled to said server and said programming device.

7. The method as defined in claim 6 further consisting of providing vehicle information to a server.

8. The method as defined in claim 7 further consisting of receiving vehicle specific information from said server.

9. The method as defined in claim 7 further consisting of remotely programming said vehicle key from a customer service center.

10. A device for programming a blank vehicle key, the device comprising;
    a housing encasing a device processor;
    a vehicle interface for communicatively coupling with a vehicle and a vehicle key;
    said device communicatively coupled with a personal communication device having a vehicle key programming application; and
    said device utilizing vehicle specific information and said application connected to a system server to download a logic algorithm in order to program said vehicle key with an immobilizer algorithm to enable said key to work with said vehicle.

11. The device as defined by claim 10 wherein said device is a dongle.

12. The device as defined by claim 10 wherein said device is single use.

* * * * *